United States Patent Office 2,736,655
Patented Feb. 28, 1956

2,736,655

PROCESS FOR MAKING APPLE SYRUP

Max Gordon and Leila Gordon, Rhinebeck, N. Y.

No Drawing. Application March 31, 1953,
Serial No. 346,043

7 Claims. (Cl. 99—142)

This invention relates to the production of apple syrup and to the product thereby produced.

Attempts have been made in the past to produce apple syrup from fresh apples with little or no success in that the products hitherto produced have not been satisfactory as to clarity, color and taste, being in those respects frequently turbid, discolored or darkly colored and lacking in a fresh apple taste having the desired combination of acidity and sweetness and usually lacking natural ester taste qualities. Apple syrup made by the liming process also has an unpleasant acid aftertaste probably due to the presence of calcium malate. In many cases, also, these prior products were subjected to processing steps which caused caramelization or darkening, had inadequate sugar content and poor keeping qualities and contained too high a starch content and, in general, therefore, failed to provide a high-grade salable product, with the result that, to the best of our knowledge, there is no satisfactory apple syrup being marketed today despite the large amount of work which has been done on the problem and despite the recognized need for the solution of this problem. To a limited extent, apple syrup made by the liming process has found use as a humectant for tobacco. It has, however, no characteristic apple taste.

Our invention has for its objects the overcoming of the disadvantages and drawbacks of prior products and prior processes and the production of a clear, sparkling, high-grade apple syrup product which meets all taste and commercial requirements and which provides for the first time an apple syrup for table use which has a pleasant apple taste and other desirable properties making it fully suitable for edible purposes.

Another object of the invention resides in a novel and highly useful combination of procedural operations which results in the economical and efficient production of our new product which has been found to have unique qualities as to taste and appearance and excellent marketability in contrast with previously available products.

A further object of the invention resides in the steps of processing fully ripe apples in accordance with certain special procedures, as hereinafter more fully set forth, wherein a concentrated, clear apple juice is made, the apple essence separated therefrom and the remainder converted to syrup followed by the re-incorporation of the essence so as to produce a full flavored product containing the essential flavoring components of the fresh apples.

Other and still further objects and advantages reside in the various combinations of steps hereinafter set forth and in such other and further matters as will be understood by those skilled in this art.

According to the invention, fresh, fully ripe apples are pulverized and pressed to express the juice therefrom as by being fed to a hammer mill wherein they are converted to a fine pulp and from which the juice is substantially completely expelled by pressure due to the substantially complete rupturing of the natural cellular structure of the apples. The pomace may be discarded or used as a by-product. To the juice thereby produced, a catalyst is added and the juice in such condition is allowed to stand and is then filtered, using as a filter aid a diatomaceous earth such as the well-known material "Supercel," thus producing a brilliantly clear juice filtrate which is concentrated to approximately half its volume by any suitable method for eliminating water without causing caramelization or driving off volatile flavoring substances and the concentrated juice so produced is then placed in a pasteurizing tank. The apple essence, i. e., the esters present in the apple juice and to which the apple juice owes its characteristic color, odor and flavor, is then removed by fractionation at a temperature ranging from about 135–150° F.

The residual material, without the thus removed essence, is raised to a temperature of approximately 200° F. and to the same is added, with agitation, pure white granulated sugar until the sugar content of the product is increased to that requisite for syrup production, at which time the viscosity of the product will be approximately 65 Brix. At this stage the apple essence is re-incorporated and thoroughly admixed. The product is then bottled at a slow pasteurization temperature of 190° F. through a vacuum filler and capped and finally subjected in the bottles to a cold-water spray for cooling, following which the bottles are dried, labeled and ready for shipment.

The invention will be more fully understood from the following detailed, explanatory example thereof which is intended as illustrative and not as a limitation upon the invention.

*Example*

1200 pounds of fully ripe, sound apples, preferably a mixture of Early McIntosh, Dutchess and Gravenstein apples, were fed by means of a suitable conveyor or escalator to a hopper, whence they were introduced into a hammer mill and converted by pulverization to a very fine pulp and pressed to express their juice. It has been found in this connection that the use of fully ripe apples with very little or practically no starch content simplifies the procedure, enables an exceptionally fine product to be produced having a higher malic acid content than could be otherwise provided and increases the yield of syrup based on the weight of the apples but the invention is not thereby limited since other apples may be satisfactorily employed in the carrying out of the process.

From the 1200 pound batch of apples, 100 gallons of juice were obtained but this juice was very cloudy and contained a good deal of sediment. To the 100 gallons of juice so produced, we added 1 pound of Pectinol A, a product sold under that name by Rohm & Haas and used for juice clarification but, in our invention, Pectinol A acted as a catalyst because we discovered that, in the manufacture of apple syrup in accordance with our present procedure, new and unusual results were secured through the use of this substance as an enzyme catalyst. Whereas, under microscopic examination the sugar particles in the apple juice appeared as granular, after the addition of Pectinol A, they became elongated and enlarged and, consequently, placed the sugar in a different physical condition which affected the flow characteristics of our syrup and endowed the same with exceptionally free-flowing qualities despite a relatively high viscosity, due to the changed physical shape and size of the sugar particles. Tests have proved that when the Pectinol A was omitted a different and far less desirable product was secured which was very difficult or even impossible to filter and from which a satisfactory apple syrup could not be made. The Pectinol A acted as a true catalyst because it itself underwent no change but catalyzed the physico-chemical changes indicated. In addition, the catalyst caused depectinization and inhibited undesired enzymatic action.

The apple juice and the Pectinol A were allowed to stand at a temperature of approximately 70° F. (room temperature) overnight and subsequently filtration was carried out using an earthy filter aid such as the well-known "Supercel," which is an inert, insoluble material mixed with liquids to assist pressure filtration. This was carried out by placing the juice in a 600 gallon agitated tank to which about 6–7 pounds of "Supercel" were added in very fine powdered form, but it is to be understood that other filter aids may be employed, such as any of the known diatomaceous earths. The filtrate resulting at this stage of the process was brilliantly clear and was entirely free from cloudiness and solid particles of any visible nature. Any suitable type of plate press or a Sweetland press may be employed.

The juice filtrate was next reduced to approximately half its volume, usually from 100 gallons to about 50 but not more than 70 gallons, depending somewhat upon the Brix content of the juice, which usually varies from 10 to 14 Brix, and this concentration may be carried out in any suitable manner, such as by freezing the juice by means of a Freon refrigerating compressor unit in a suitable tank or container and the juice drawn off leaving the ice behind, thereby reducing the volume of the juice through the elimination of water following the optional practice of freezing and removing the ice, which has been found to be highly undesirable to the point of being impracticable. The volume of the juice may, however, be reduced by mild heating under a reduced pressure and, in connection with the reduction in volume, it was highly important, we found, to carry out concentration either by freezing or by mild heating in a partial vacuum, since this avoids the use of temperatures which would cause caramelization of sugar with consequent darkening and discoloration of the product and alteration in its taste, as well as avoiding volatilization and loss of the apple essence which must be retained. It is well known that sugar is readily caramelized by heat and we particularly avoid any treatment which could so result.

The concentrated juice was then placed in a pasteurizing tank to which was attached a stripping column which was essentially a fractionation column or, alternatively, a condenser. This arrangement was employed to remove the apple essence, i. e., the apple esters, while other procedure was being carried out on the remainder and prior to the re-incorporation of this essence at a later stage in the process, such constituting a particular and important feature of our invention. The stripping column was preferably a 60 ft. length of helically coiled copper or stainless steel tubing enclosed in a 55 gallon tank. A ⅓ horsepower vacuum pump and motor was attached thereto. The apple essence came off as a vapor and flowed through the helical coil while at the same time cold water was continuously flowed into the tank and around the coil for cooling purposes and to condense the vapor which was collected in a container located at the discharge end of the coil. From the 100 gallons of juice obtained by the pressing of 1200 pounds of ripe apples, approximately ⅞ of a gallon of essence was obtained in the manner described and, in removing and separating the essence, it is important that vaporization be discontinued when all the essence has been distilled off since, if the procedure is carried further, substantially only water vapor comes off and is condensed, thereby diluting the essence and while the presence of a minor amount of water is unobjectionable in the essence it has been found that the sharper the essence fraction, the better the entire procedure and the better the ultimate product. This distillation and the condensation and collecting of the ester fraction took place while the juice was heated to a temperature within the range of about 135–150° F. and, in order to separate the essence in the manner described, a pasteurizer heating unit was connected to the vacuum pump. It was found that it takes approximately 15 minutes to collect the ester fraction in the manner described within the said temperature range of 135–150° F. and, therefore, it has been found to be adequate to collect that fraction which was removed in the given temperature range during a 15 minute interval, at the end of which time the coil and fractionating equipment were disconnected and detached and the remaining apple juice was then increased in temperature up to approximately 200° F., at which time 600 pounds of pure white granulated sugar were added with agitation. It has been found that agitation for approximately 15 minutes at the 200° F. temperature was adequate. Viscosity readings may be taken and, when the Brix reaches a minimum of 65, the apple essence is re-incorporated in the heated sugar-containing juice—now syrup—and thoroughly agitated.

The syrup so produced was then bottled at 190° F. under slow pasteurization through a vacuum filter since it has been found that the use of conventional flash-pasteurization was not satisfactory and was undesirable because it caused the product to become cloudy. Bottling was carried out by means of any suitable or conventional filling equipment and the filled bottles were immediately capped and then passed through a cold water spray to cool the product down to at least about room temperature and to inhibit further chemical, enzymatic or other change. The product was a brilliantly clear apple syrup. The bottles were then labeled and were ready for shipment.

The foregoing example sets forth in considerable detail the procedure which is preferably followed and which has been found to give the desired results, but it is to be understood that certain variations may be resorted to without departing from the invention. While early McIntosh, Dutchess and Gravenstein apples are found to be best due to their relatively high malic acid content, it is to be understood that other apples may, of course, be employed. While under the conditions noted, 1200 pounds of fully ripe, sound apples with practically no starch content initially yielded approximately 100 gallons of juice, the type of apple and the time of year have some influence on the yield and quality of juice. It has been found that for each 100 gallons of juice approximately 1 pound of the Pectinol A is needed and that for each 100 gallons of juice approximately 6–7 pounds of the earthy filter aid in very fine powdered form are required. For each 100 gallons of juice, 600 pounds of pure white granulated sugar are needed in order to bring the sugar content and viscosity up to the point at which the product is of syrupy consistency and appropriate Brix reading. It has further been found that from each 100 gallons of juice approximately ⅞ of a gallon of apple essence comes off within the temperature range of 135 to 150° F., but it will, of course, be understood that the actual amount of essence obtained in any given instance depends upon the kinds of apples employed and their ripeness. One of the advantages of the invention is that it is not necessary to use fancy eating or table grade apples since culls or even slightly over-ripe apples can be employed and, in fact, it has been found that apples which are fully ripe to the point of being just slightly over-ripe constitute the best starting material for our purposes and, therefore, our new apple syrup can be made very economically. The particular equipment mentioned is to be understood as exemplary only since any suitable equipment may be employed which is available and which can be utilized to carry out the relatively simple steps involved.

We claim:

1. A process for producing apple syrup which comprises, in combination, the steps of pressure extracting the juice of ripe apples, adding a catalyst thereto, filtering such juice until clear, concentrating the filtered juice to reduce its volume by lowering its water content, separating the apple essence from the concentrated apple juice, adding sugar to the residual apple juice to convert it to a syrup and re-incorporating the separated apple essence.

2. A process for producing apple syrup in accordance with claim 1, in which the catalyst is Pectinol A.

3. A process for producing apple syrup in accordance with claim 1, in which the catalyst is the enzyme catalyst Pectinol A and the amount thereof added is in the proportion of 1 pound to each 100 gallons of apple juice.

4. A process for producing apple syrup in accordance with claim 1, in which filtering is effected in the presence of a diatomaceous earth filter aid which is added in the proportion of approximately 6 to 7 pounds for each 100 gallons of juice.

5. A process for producing apple syrup in accordance with claim 1, in which the apple essence is removed from the concentrated apple juice by fractionation within the temperature range of approximately 135 to 150° F. for a period of approximately 15 minutes.

6. A process for producing apple syrup in accordance with claim 1, in which the amount of sugar added is in the proportion of approximately 600 pounds for each 100 gallons of juice.

7. A process for producing apple syrup in accordance with claim 1, in which the syrup is subjected to slow pasteurization at a temperature of approximately 190° F.

References Cited in the file of this patent

UNITED STATES PATENTS

| | | |
|---|---|---|
| 1,362,870 | Johnson | Dec. 21, 1920 |
| 1,746,993 | Dale | Feb. 11, 1930 |
| 2,479,745 | Homiller et al. | Aug. 23, 1949 |
| 2,530,322 | Ash | Nov. 14, 1950 |